(12) United States Patent
Cottles et al.

(10) Patent No.: US 6,697,206 B2
(45) Date of Patent: Feb. 24, 2004

(54) TAPE EDGE MONITORING

(75) Inventors: Vernon M. Cottles, Maplewood, MN (US); Mark R. Drutowski, St. Paul, MN (US)

(73) Assignee: Imation Corp., Oakdale, MN (US)

( * ) Notice: Subject to any disclaimer, the term of this patent is extended or adjusted under 35 U.S.C. 154(b) by 485 days.

(21) Appl. No.: 09/741,459

(22) Filed: Dec. 19, 2000

(65) Prior Publication Data

US 2002/0075588 A1 Jun. 20, 2002

(51) Int. Cl.[7] .................. G11B 15/18; G11B 17/00; G11B 19/02
(52) U.S. Cl. ...................... 360/72.1; 360/72.3
(58) Field of Search .................... 360/71, 72.3, 72.1

(56) References Cited

U.S. PATENT DOCUMENTS

| | | | |
|---|---|---|---|
| 4,176,381 A | * 11/1979 | de Niet et al. | 360/77.12 |
| 4,913,328 A | * 4/1990 | Schulz | 226/21 |
| 5,294,803 A | * 3/1994 | Pahr | 250/559.36 |
| 5,357,335 A | 10/1994 | Sparks et al. | |
| 5,822,213 A | 10/1998 | Huynh | |
| 6,046,764 A | 4/2000 | Kirby et al. | |
| 6,459,494 B1 | * 10/2002 | Kurokawa et al. | 356/637 |

OTHER PUBLICATIONS

Pamphlet entitled "LA 511 Laser Beam Sensors" from SUNX, Automation Sensors, Inc., Minneapolis, MN, pp. 1–14.

* cited by examiner

*Primary Examiner*—David Hudspeth
*Assistant Examiner*—Jason Olson
(74) *Attorney, Agent, or Firm*—Eric D. Levinson

(57) ABSTRACT

The position of one or both edges of tape, such as magnetic tape, can be determined using a light source, such as a solid-state laser with a collimated beam, and a detector, such as a photodiode. The tape, by blocking a portion of the light, affects the amount of light reaching the detector. The detector generates signals as a function of the position of the tape. In the case of two detectors cooperating to measure the positions of opposing edges of the tape, the signals from the detectors may be processed to produce at least four useful signals, including a signal that is a function of the tape width and a signal that is a function of the position of the tape centroid.

19 Claims, 6 Drawing Sheets

TAPE EDGE MONITORING

FIELD

The invention relates to data storage media. In particular, the invention relates to techniques for monitoring the position of data recording tape.

BACKGROUND

The capacity to detect the position of one or more edges of data recording tape, such as magnetic tape is useful many circumstances. For example, data about edge positions are useful in research and development of data recording tape and also devices that use such tape. Edge data are also useful in manufacturing and quality control. Devices that use data recording tape may employ edge data in several ways, e.g., as part of a diagnostic tool, as an indication that the tape is departing from the ideal tape path or as an indication that the tape has become damaged in use.

SUMMARY

In one embodiment, the invention provides a system that includes a source of collimated light, such as a laser, and data recording tape that is substantially opaque to the light. The tape may be magnetic tape. The tape is positioned to block a portion of the collimated light. The system also includes a detector, such as a photodiode, configured to detect the light and to generate a signal based upon the detection. The signal from the detector is a function of the position of an edge of the tape. The system may include a pair of sources of collimated light and detectors to generate two signals dependent upon the positions of opposing edges of the tape. These signals may be added, subtracted or otherwise processed to generate additional useful signals. The signals provide indications of tape edge position or other tape data that are generally insensitive to changes in the tape plane.

In other embodiments, the invention provides methods for processing signals that are a function of the edge positions of tape.

In a further embodiment, the invention presents a method for generating a function that relates the signals to the edge positions.

Other advantages, features and embodiments of the present invention will become apparent from the following detailed description and from the claims.

DETAILED DESCRIPTION

Figure 1:
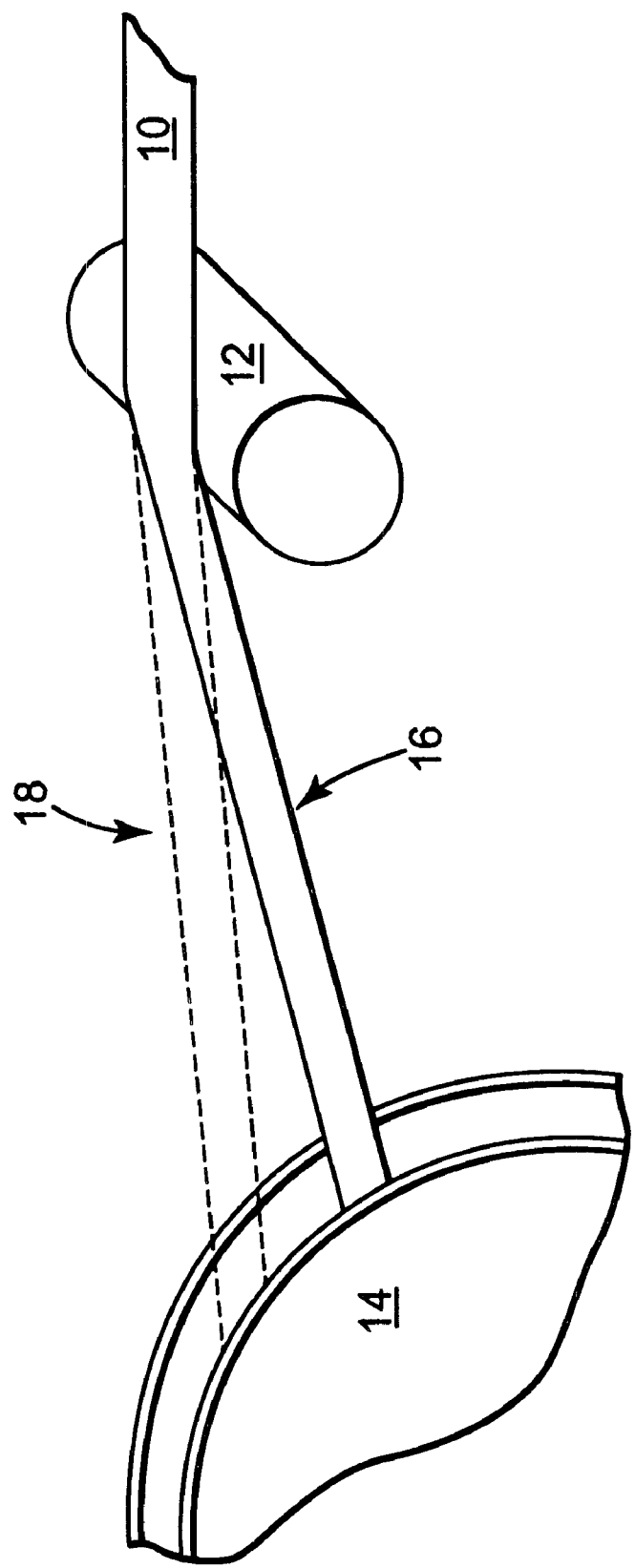
FIG. 1 is a perspective drawing of data recording tape with a guide and a spool.

FIG. 1 shows data recording tape 10 being drawn across a guide 12 and being taken up by a spool 14. Tape 10 may be, for example, magnetic tape or optical recording tape. The plane 16 of tape 10 is defined by the path of tape 10 across guide 12 and the amount of tape 10 already spooled on spool 14. As spool 14 takes up more tape 10, the tape plane changes, as illustrated by reference numeral 18. Tape 10, guide 12 and spool 14 may be housed within a tape cartridge. Spooling of tape 10 is an exemplary application in which edge detection may be used to generate useful data, but the invention is not limited to this application. The edge detection techniques described below advantageously provide edge data and are generally insensitive to changes in tape plane such as those shown in FIG. 1.

Figure 2:
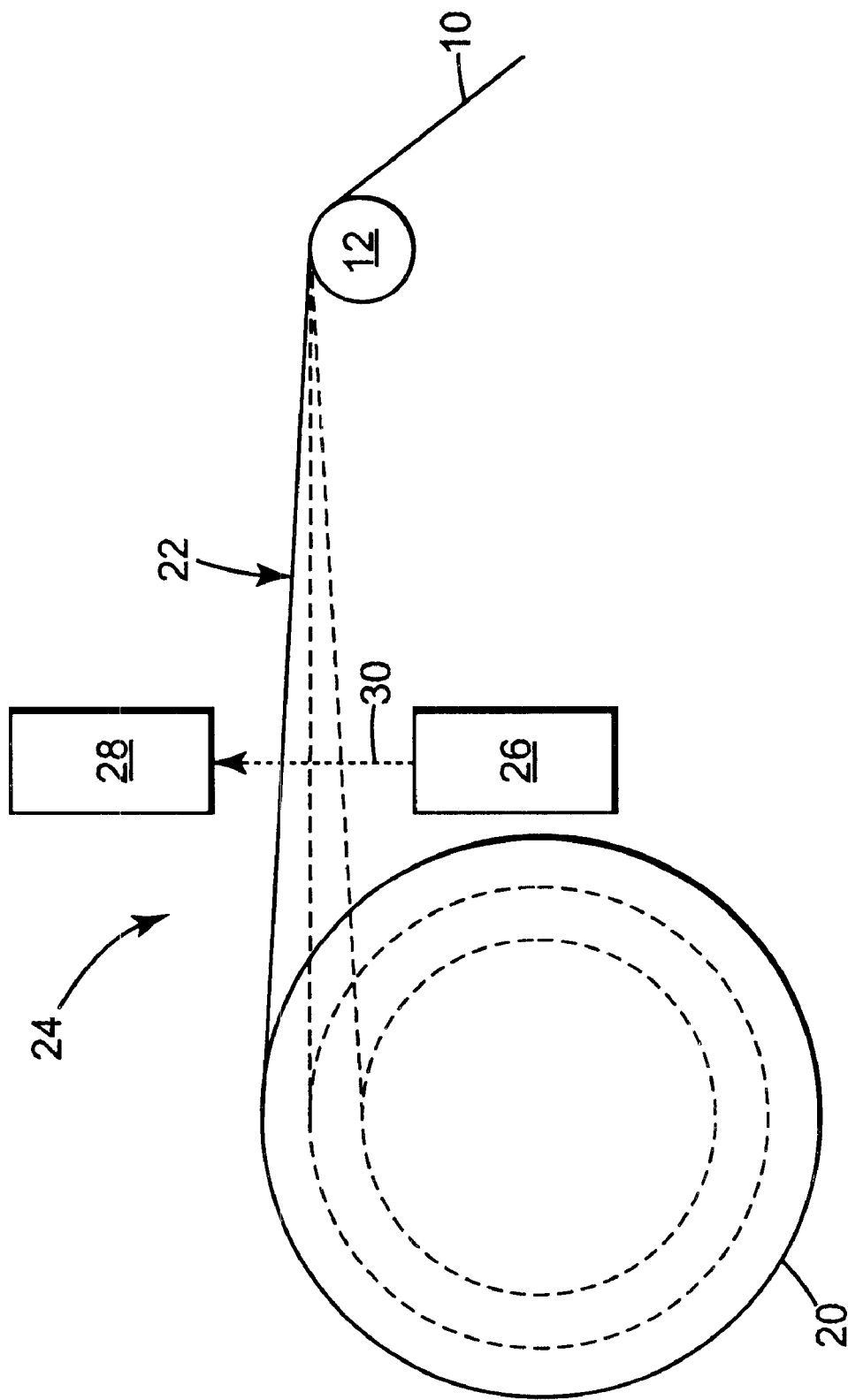
FIG. 2 is a cutaway view of data recording tape with a guide a spool and an edge-detection system.

FIG. 2 is a cutaway view showing a coil 20 of tape 10 wound on a spool (not shown in FIG. 2). Three diameters of coil 20, with corresponding tape planes 22, are shown in FIG. 2. FIG. 2 also shows an edge-detection system 24, which includes an emitter unit 26 and a detector unit 28. Emitter unit 26 emits a collimated beam of light 30, toward tape 10 and detector unit 28. Some of the light from beam 30 is intercepted and blocked by tape 10, and does not reach detector unit 28. Light from beam 30 that is not blocked by tape 10 is detected by detector unit 28. As will be described below, the amount of light detected by detector unit 28 is a function of an edge position of tape 10. Because beam 30 is collimated, however, the amount of blocked light is not a function of changing tape planes 22.

Figure 3:
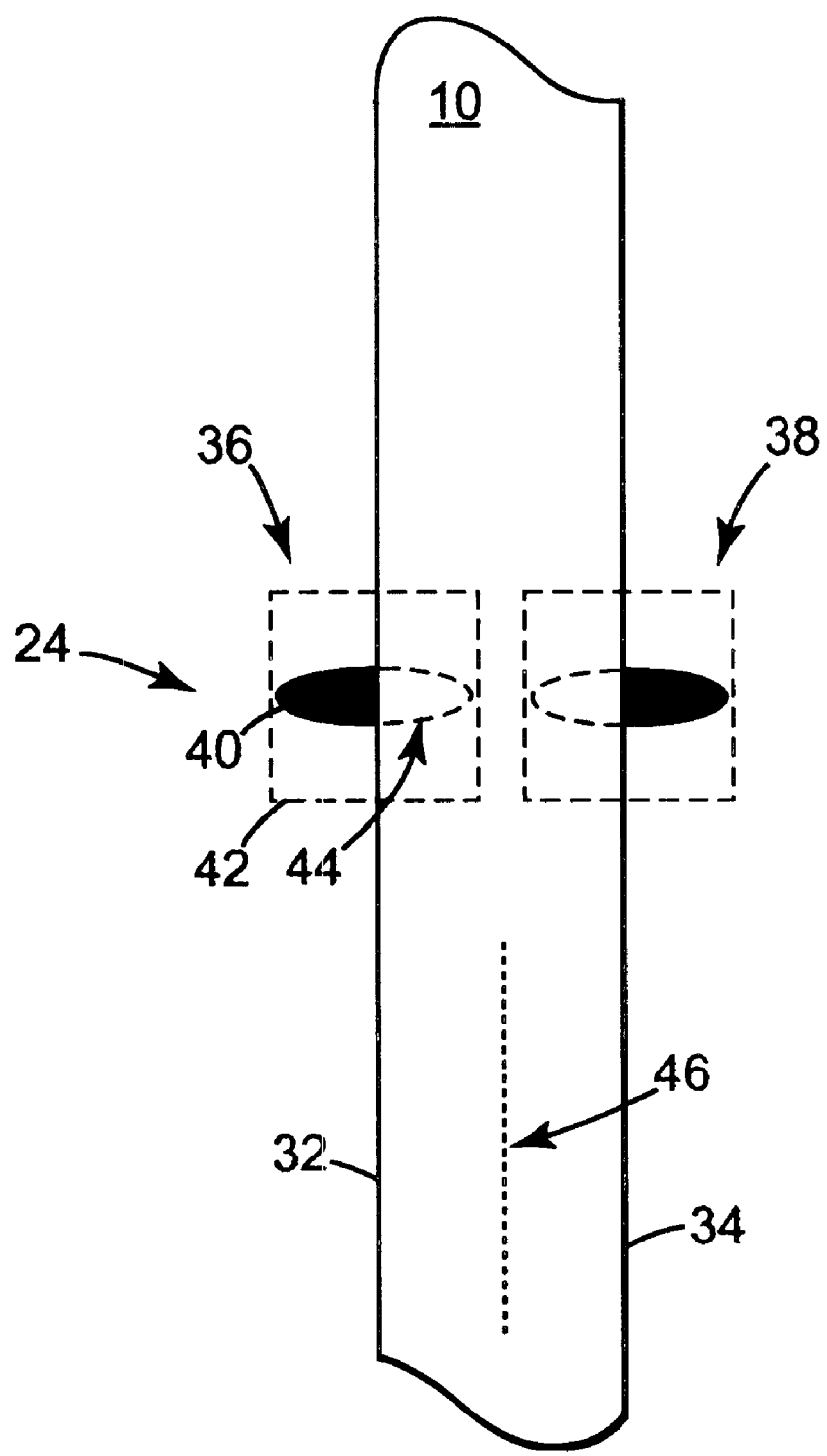
FIG. 3 is a plan view of data recording tape and an edge-detection system.

FIG. 3 is a plan view of edge-detection system 24. Tape 10 includes a first edge 32 and a second edge 34. FIG. 3 also shows tape centroid 46, defined as the midpoint between edges 32 and 34. Ideally, the edges 32 and 34 should be a constant distance apart, such as 0.5 inches (1.27 cm) along the full length of tape 10. Edge-detection system 24 includes two edge-detection subsystems 36 and 38. First edge-detection subsystem 36 monitors the position of first edge 32, and second edge-detection subsystem 38 monitors the position of second edge 34. Edge-detection subsystems 36 and 38 monitor opposing edges of tape 10.

First edge-detection subsystem 36 and second edge-detection subsystem 38 operate using the same principles, so for simplicity only first edge-detection subsystem 36 will be described in detail. First edge-detection subsystem 36 includes a source of light 40 that produces a collimated beam of light. The beam of light is emitted toward a detector 42. Some of the light from source 40 is blocked 44 by tape 10 and does not reach detector 42. Source of light 40 is preferably a solid-state laser. The laser may include a collimating lens. The wavelength of emitted light may depend upon the composition of tape 10. When tape 10 is magnetic tape, for example, a solid-state laser emitting light at a wavelength of about 670 nm is useful because magnetic tape is substantially opaque to light at that wavelength. Total opacity to the light is not required, but reduced opacity generally results in reduced detector sensitivity.

As shown in FIG. 3, the shape of the collimated beam is elliptical, but the beam may be of any shape. An example of an elliptical collimated solid-state laser emitting light at about 670 nm is a Micro VLM manufactured by Coherent, Inc.™ This laser includes an elliptical beam approximately 4.0 mm by 1.0 mm, with a power output of approximately 3.0 mW. An exemplary detector 42 is a photodiode. Alternatively, detector 42 may include an array of photodiodes. An example of a photodiode that may be used as a detector is a reverse biased, high-speed response silicon detector, approximately 15.0 square mm, with a responsivity of 0.55 A/W at a wavelength of 900 nm. A photodiode produces current as a function of the intensity of the light striking the photodiode, and the intensity of the light striking the photodiode is a function of the light not blocked by tape 10. The amount of light blocked by tape 10 is a function of the position of edge 32. The current generated by detector 42, therefore, is a function of the position of edge 32.

Edge-detection subsystems 36 and 38 are shown in FIG. 3 as including two independent lasers. An alternative arrangement may use a single laser and a beam splitter to create two beams from a single source. Beam-splitting, however, results in both beams having less intensity than generating each beam with an independent laser.

Figure 4:
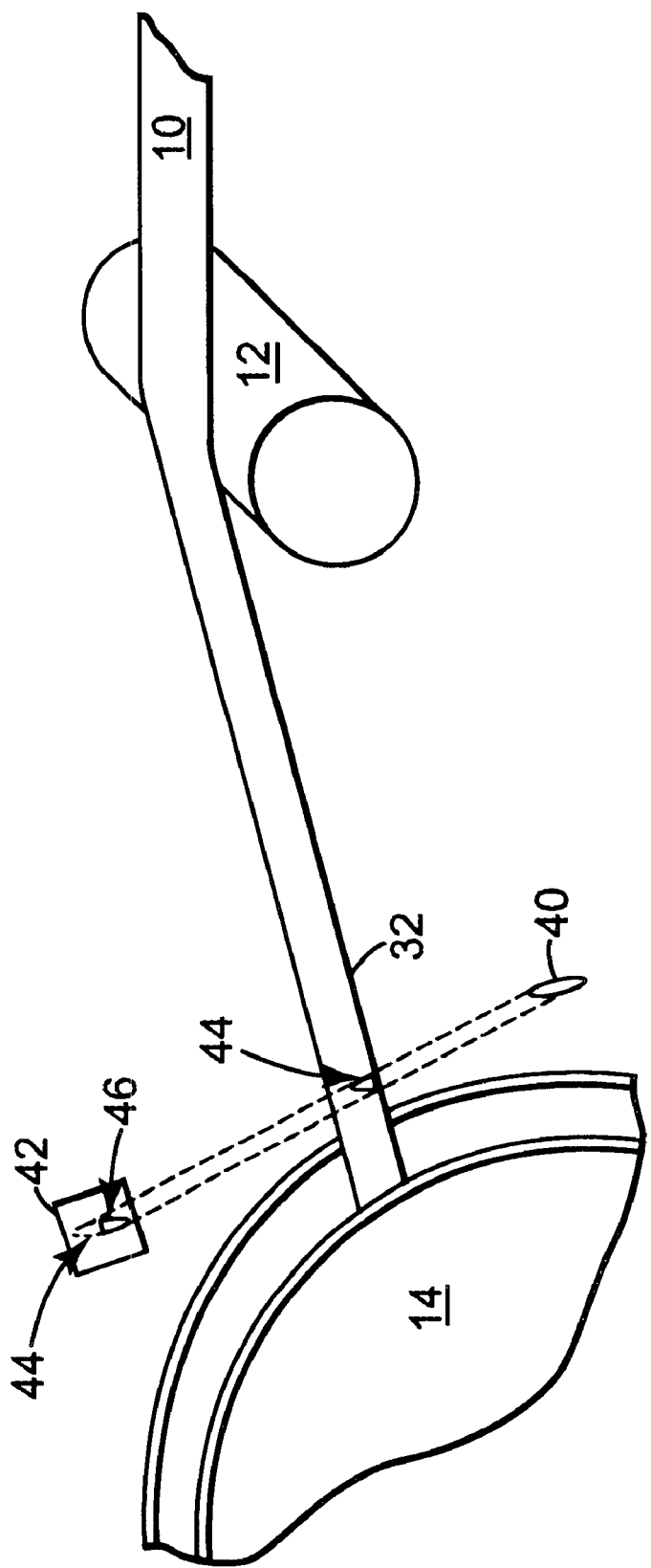
FIG. 4 is a perspective view of data recording tape with a guide a spool and an edge-detection system.

FIG. 4 is a perspective view of the edge-detection system 24 shown in FIG. 3, except that subsystem 38 is not depicted. First edge-detection subsystem 36 includes a light source 40, such as a laser, that produces a collimated beam of light directed toward detector 42. Some of the light from source 40 is blocked 44 by tape 10 and does not reach detector 42. The portion of light not blocked 46 reaches detector 42 and causes the generation of current as a function of the position of tape edge 32.

Figure 5:
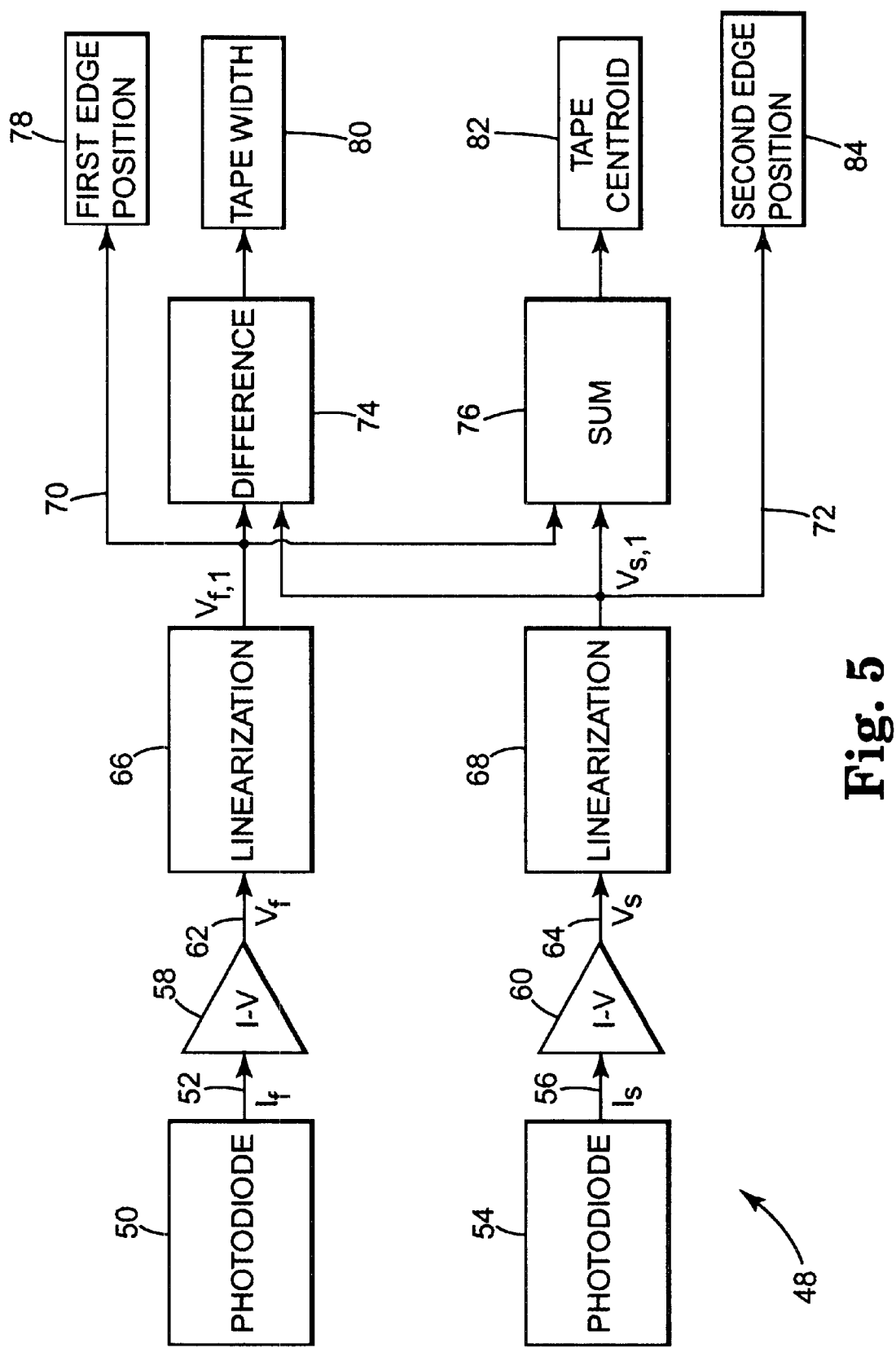
FIG. 5 is a block diagram of a signal processing system.

FIG. 5 is a block diagram of a signal processing system 48. Signal processing system 48 includes a first photodiode 50 which generates a first current $I_f$ (52) as a function of the position of first edge 32 and a second photodiode 54 that generates a second current $I_s$ (56) as a function of the position of second edge 34. Current-to-voltage converter 58 converts current $I_f$ (52) into voltage $V_f$ (62), and current-to-voltage converter 60 converts current $I_s$ (56) into voltage $V_s$ (64). Voltages $V_f$ (62) and $V_s$ (64) may undergo linearization (66, 68), as will be described in more detail below, generating voltages $V_{f,l}$ (70) and $V_{s,l}$ (72). Voltage $V_{f,l}$ (70) is a function of the position of first edge 32 (76), and voltage $V_{s,l}$ (72) is a function of the position of second edge 34 (82). Voltages $V_{f,l}$ (70) and voltage $V_{s,l}$ (72) can serve as signals representing the positions of the first edges (78) and the second edge (84).

Signals correlated to edge position (78, 84) are useful in several contexts, such as tracking the tape path, measuring tape disturbances and detecting tape excursions. Signals correlated to edge position (78, 84) may also be used to detect tape deformations such as cupping or curvature. Position signals (70, 72) may be supplied to a component that subtracts voltages (74). Subtracting (74) voltage $V_{f,l}$ (70) from $V_{s,l}$ (72) produces a signal that is a function of the width of tape 10 (80). A signal correlated to tape width (80) is useful in quality control during production, for example, or in detecting damaged tape. Position signals (70, 72) may also be supplied to a component that adds voltages (76). Adding (76) voltage $V_{f,l}$ (70) to $V_{s,l}$ (72) produces a signal that is a function of the position of the centroid of tape 10 (82). Treating voltage $V_{f,l}$ (70) as representing the position of first edge 32 (78) and voltage $V_{s,l}$ (72) as representing the position of second edge 34 (84), the voltage $(V_{f,l}+V_{s,l})/2$ represents the position of the centroid, which is halfway between the edges. A signal reflecting centroid position (82) may be useful, for example, in detecting lateral tape deformations. Components that subtract (74) or add (76) may be analog or digital. An analog difference amplifier, for example, may be used to find the difference (74) between analog signals. Alternatively, analog voltage signals (70, 72) may be converted to digital signals and subtracted by a digital arithmetic processor such as a computer.

Further processing of output signals (78, 80, 82, 84) may be performed. Taking a derivative of first edge 32 position signal (78) with respect to time, for example, may be used to determine the speed of motion of first edge 32. For processing operations that measure changes over time, high-speed photodiode detectors such as the detectors described provide good responsiveness to high-frequency changes.

Figure 6:
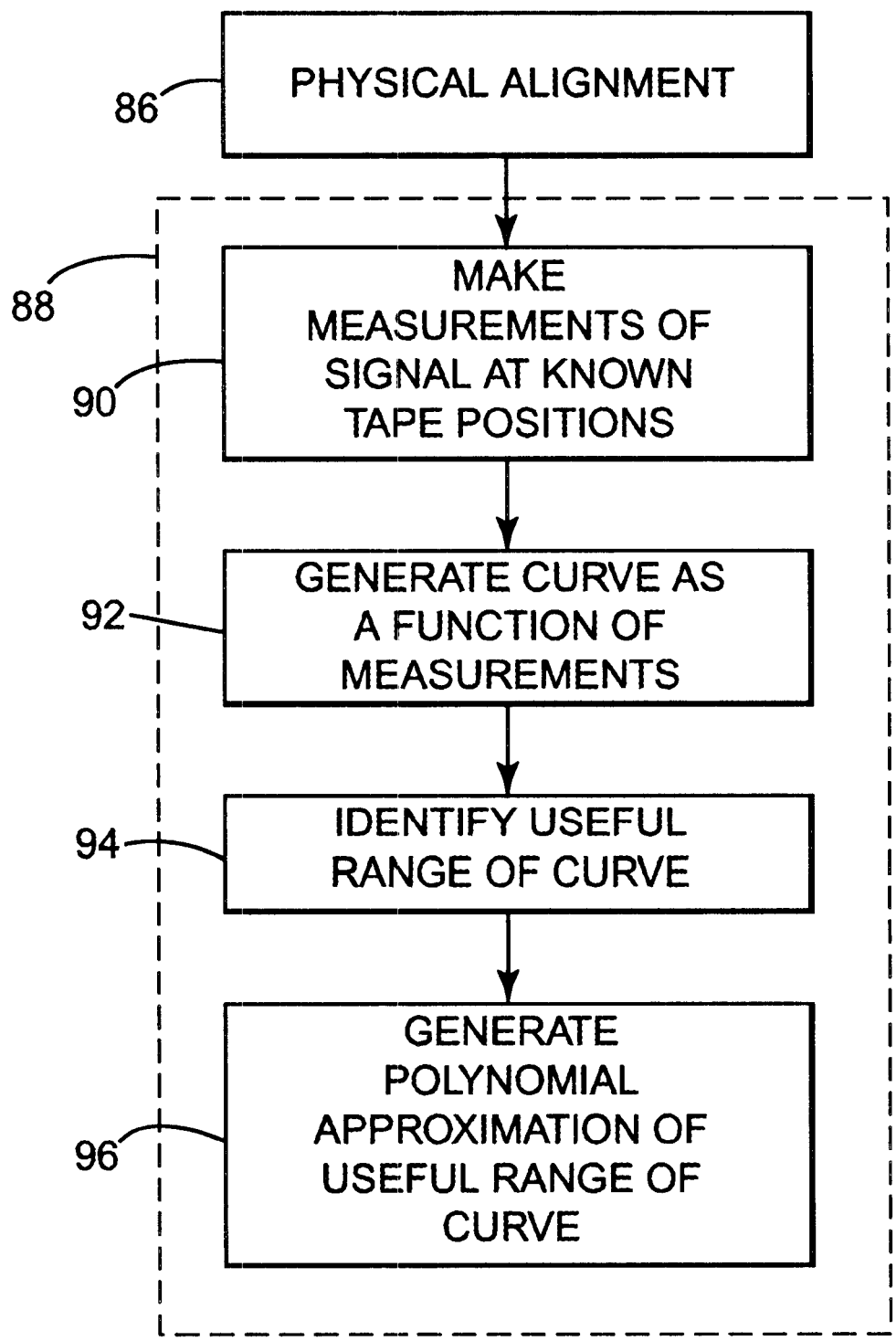
FIG. 6 is a flowchart showing calibration techniques.

Edge detection system 24 ordinarily requires some calibration, as shown in FIG. 6. Some of the calibration involves physical alignment of the components (86). The beams may be collimated, for example, to prevent inaccurate readings caused by changes in the tape plane, as shown in FIGS. 1 and 2. In addition, the lasers and detectors should be oriented such that the beam from each source is well-targeted upon the respective detector. The lasers and detectors should be positioned to allow for partial blocking of the collimated beams and thus to detect edge positions, as shown in FIGS. 3 and 4. In addition, linearization (66, 68) can be employed to improve the correlation between the edge positions and the resulting output signals (78, 80, 82, 84).

FIG. 6 further shows a technique for calibrating linearization functions (88). As part of calibration, incoming voltage signals $V_f$ (62) and $V_s$ (64) may be measured as the tape is progressed through a series of known positions (90). The known tape positions may vary from fully blocking the beam from reaching the detector, to partially blocking beam, to fully exposing the beam to the detector. Alternatively, the known tape positions may span a smaller range of positions partially blocking the beam. The measurements generate a curve that varies according to the changes in light received by the photodiodes (92).

The light received by the photodiodes depends in turn upon the fraction of the beam blocked by the tape, which in turn is a function of the position of the edge of the tape. As a result, each point on the curve corresponds to a position of the edge of the tape. The measured curve varies with the shape of the beam. The elliptical lasers described above would be expected to produce signals that vary along a curve defined by integration of an ellipse. The lasers may not be perfectly elliptical, however, and so the actual curve may vary from the expected curve. In addition, the actual positions of the tape edges may be restricted to a range of positions. For example, it may be extremely unlikely that the tape edge will ever block more than eighty percent, or that the tape will block less than twenty percent, of the beam. Consequently the portion of the curve corresponding to those extreme edge positions will not be used. Accordingly, after identifying the useful range of the curve (94), the useful range of the curve may be approximated with a polynomial (96) that accurately correlates edge position with the curve. In general, as the range of permissible edge positions becomes more restricted, the useful range of the integration curve is reduced, and the order of polynomial needed to approximate the integration curve is smaller. The converse is also generally true. The measurements correlated with known edge positions may be digitized, and a computer may be employed to derive a polynomial that best fits the digitized curve. Many curve-fitting programs or routines, such as MATLAB™ from MathWorks™, Inc., can derive a best-fit curve for a given range and a given order of polynomial.

By selecting a higher order polynomial, the approximation becomes considerably more accurate. A second-order polynomial, for example, may result in measurements that may be as much as 170 microns high or low, while an eighth-order polynomial may result in errors smaller than a third of a micron. The polynomials derived for each photodiode (50, 54) usually will be different. Linearization (66, 68) involves applying the polynomials to the respective voltage signals (62, 64), thereby accurately correlating the voltage signals with the actual edge positions. In other words, the polynomial represents the function relating the signals (62, 64) to the edge positions.

The calibration techniques shown in FIG. 6 are exemplary. Calibration may involve other techniques as well. Adjustments such as scaling factors may be made to signal processing system 48, for example, to offset differences between the lasers and between the photodiodes.

Several embodiments of the present invention have been described. These and other embodiments are within the scope of the following claims.

What is claimed is:

1. A system comprising:
   a source of collimated light;
   tape, wherein the tape is substantially opaque to the light and wherein the tape is positioned to block a portion of the collimated light; and
   a detector configured to detect the light and to generate a signal based upon the detection.

2. The system of claim 1, wherein the tape is magnetic recording tape.

3. The system of claim 1, wherein the signal is a function of the position of an edge of the tape.

4. The system of claim 1, wherein the source of collimated light comprises a laser.

5. The system of claim 4, wherein the laser comprises a solid-state laser.

6. The system of claim 1, wherein the detector comprises a photodiode.

7. The system of claim 1, wherein the source is a first source; wherein the detector is a first detector configured to detect light from the first source; and wherein the signal is a first signal, the system further comprising:
   a second source of collimated light; and
   a second detector configured to detect light from the second source and to generate a second signal based upon the detection;
   wherein the tape is opaque to the light from the second source and wherein the tape is positioned to block a portion of the collimated light from the second source.

8. The system of claim 7, wherein:
   the first signal is a function of the position of a first edge of the tape,
   the second signal is a function of the position of a second edge of the tape, and
   the first edge and the second edge are opposing edges of the tape.

9. The system of claim 7 further comprising a circuit configured to receive the first signal and the second signal and to generate a third signal as a function of the difference between the first signal and the second signal.

10. The system of claim 7 further comprising a circuit configured to receive the first signal and the second signal and to generate a third signal as a function of the sum of the first signal and the second signal.

11. A method comprising:
    receiving a first signal, the first signal being a function of the position of a first edge of tape;
    receiving a second signal, the second signal being a function of the position of a second edge of the tape; and
    subtracting the first signal from the second signal to generate a third signal, the third signal being a function of the width of the tape.

12. The method of claim 11, wherein the first signal and the second signal comprise voltage amplitudes.

13. A method comprising:
    receiving a first signal, the first signal being a function of a first amount of received collimated light, the first amount of received collimated light being a function of a position of a first edge of a tape;
    receiving a second signal, the second signal being a function of a second amount of received collimated light, the second amount of received collimated light being a function of a position of a second edge of the tape; and
    adding the first signal to the second signal to generate a third signal, the third signal being a function of the position of the centroid of the tape.

14. The method of claim 13, wherein the first signal and the second signal comprise voltage amplitudes.

15. The method of claim 13, wherein generating the third signal further comprises dividing the sum of the first and second signals by two.

16. A method comprising:
    receiving a plurality of signals, each signal being a function of a position of an edge of a tape;
    generating a curve based upon the signals; and
    approximating at least a portion of the curve with a polynomial function.

17. The method of claim 16, wherein the signals comprise voltage amplitudes.

18. The method of claim 16 further comprising:
    identifying a useful portion of the curve; and
    approximating the useful portion of the curve with a polynomial function.

19. The method of claim 16, wherein the signals are calibration signals, the method further comprising:
    receiving a position voltage signal; and
    estimating the position of the tape as a function of the position voltage signal,
    wherein the function comprises the polynomial function.

* * * * *